US009777129B2

(12) United States Patent
Sumnicht et al.

(10) Patent No.: US 9,777,129 B2
(45) Date of Patent: Oct. 3, 2017

(54) FIBERS WITH FILLER

(71) Applicant: Georgia-Pacific Consumer Products LP, Atlanta, GA (US)

(72) Inventors: Daniel W. Sumnicht, Hobart, WI (US); Thomas Schulze, Rudolstadt (DE); Frank-Gunther Niemz, Rudolstadt (DE)

(73) Assignee: Georgia-Pacific Consumer Products LP, Atlanta, GA (US)

( * ) Notice: Subject to any disclaimer, the term of this patent is extended or adjusted under 35 U.S.C. 154(b) by 60 days.

(21) Appl. No.: 14/677,011

(22) Filed: Apr. 2, 2015

(65) Prior Publication Data
US 2015/0291752 A1 Oct. 15, 2015

Related U.S. Application Data
(60) Provisional application No. 61/978,323, filed on Apr. 11, 2014.

(51) Int. Cl.
| | |
|---|---|
| D01F 6/14 | (2006.01) |
| D01F 8/02 | (2006.01) |
| D21C 5/02 | (2006.01) |
| C08J 5/18 | (2006.01) |
| D21H 17/00 | (2006.01) |
| D21H 17/25 | (2006.01) |
| D21H 17/69 | (2006.01) |
| D21H 17/36 | (2006.01) |
| B29C 47/00 | (2006.01) |
| D21H 11/14 | (2006.01) |
| D21H 11/18 | (2006.01) |
| D01F 1/10 | (2006.01) |
| D21B 1/06 | (2006.01) |
| D21B 1/08 | (2006.01) |
| D06M 15/333 | (2006.01) |
| B29K 1/00 | (2006.01) |
| B29L 31/00 | (2006.01) |
| D01D 5/40 | (2006.01) |

(52) U.S. Cl.
CPC ............ C08J 5/18 (2013.01); B29C 47/0004 (2013.01); D01F 1/10 (2013.01); D01F 6/14 (2013.01); D06M 15/333 (2013.01); D21B 1/06 (2013.01); D21B 1/08 (2013.01); D21C 5/02 (2013.01); D21H 11/14 (2013.01); D21H 11/18 (2013.01); D21H 17/25 (2013.01); D21H 17/36 (2013.01); D21H 17/69 (2013.01); D21H 17/74 (2013.01); B29K 2001/00 (2013.01); B29L 2031/731 (2013.01); C08J 2329/04 (2013.01); D01D 5/40 (2013.01); Y02W 30/648 (2015.05)

(58) Field of Classification Search
CPC ............ D01F 6/14; D01F 8/02; D21C 5/025
See application file for complete search history.

(56) References Cited

U.S. PATENT DOCUMENTS

| | | | |
|---|---|---|---|
| 2,179,181 A | 11/1939 | Graenacher et al. | |
| 2,999,788 A | 9/1961 | Morgan | |
| 3,114,670 A * | 12/1963 | Iwasaki | D04H 1/54 162/146 |
| 3,447,939 A | 6/1969 | Johnson | |
| 4,110,494 A | 8/1978 | Schindler et al. | |
| 4,157,275 A | 6/1979 | Hollander | |
| 4,246,221 A | 1/1981 | McCorsley, III | |
| 4,474,907 A | 10/1984 | Genba et al. | |
| 4,495,245 A | 1/1985 | Zunker | |
| 4,713,290 A * | 12/1987 | Kwon | D01F 6/14 264/210.8 |
| 5,275,699 A | 1/1994 | Allan et al. | |
| 5,332,474 A * | 7/1994 | Maxham | D21C 9/004 162/189 |
| 5,380,403 A | 1/1995 | Robeson et al. | |
| 5,380,588 A | 1/1995 | Nishiyama et al. | |
| 5,611,885 A | 3/1997 | Hansen et al. | |
| 5,759,258 A * | 6/1998 | Sohara | C09C 1/00 106/464 |
| 5,763,100 A | 6/1998 | Quick et al. | |
| 5,772,937 A | 6/1998 | Cohen et al. | |
| 5,795,377 A * | 8/1998 | Tanner | C04B 18/243 106/164.4 |
| 5,846,378 A * | 12/1998 | Phipps | C01F 11/18 162/189 |

(Continued)

FOREIGN PATENT DOCUMENTS

| | | |
|---|---|---|
| CA | 1097466 A1 | 3/1981 |
| CA | 1227974 A1 | 10/1987 |

(Continued)

OTHER PUBLICATIONS

Altemeier, M., et al.; "Size Press Filling Boosts Ash Content, Enhances Uncoated Free-Sheet Quality"; Pulp & Paper; p. 52-54; Jan. 2004.
Bezerra, E.M.; "The Effect of Different Mineral Additions and Synthetic Fiber Contents on Properties of Cement Based Composite"; Cement & Concrete Composites; vol. 28; p. 555-563; 2006.
Chiellini, Emo, et al.; "Composite Films Based on Biorelated Agro-Industrial Waste and Poly(vinyl alcohol). Preparation and Mechanical Properties Characterization"; Biomacromolecules; vol. 2; p. 1029-1037; 2001.
Ei-Shinawy, Nabila A., et al.; "Internal Treatment of Paper Sheets From Wood and Bagasse Pulps with Polyvinyl Alcohol"; Polym.-Plast. Technol. Eng.; vol. 37, No. 2; p. 141-173; 1998.
Kane, T.G.; "Polyvinyl Alcohol/Starch Sized Can Reduce Pulp Cost for Fine Paper"; Pulp & Paper; p. 125-128; Feb. 1978.

(Continued)

Primary Examiner — Liam J Heincer
(74) Attorney, Agent, or Firm — Laura L. Bozek

(57) ABSTRACT

The present invention is directed to articles of manufacture, including fibers and films, and methods of making thereof. In accordance with the present invention, the article includes a binder impregnated with or encapsulating a filler. The binder is a polyvinyl alcohol (PVOH), cellulose nanofibrils, or a combination of the PVOH and cellulose nanofibrils. The filler is deinking waste solids comprising ash and cellulose fines.

19 Claims, 5 Drawing Sheets

(56) References Cited

U.S. PATENT DOCUMENTS

| | | | |
|---|---|---|---|
| 5,919,424 A * | 7/1999 | Klyosov | C01F 11/00 |
| | | | 210/928 |
| 5,928,741 A | 7/1999 | Andersen et al. | |
| 5,928,784 A | 7/1999 | Sugihara et al. | |
| 5,961,941 A * | 10/1999 | Klyosov | C01F 11/00 |
| | | | 423/155 |
| 6,020,425 A * | 2/2000 | Wang | C08J 5/18 |
| | | | 428/411.1 |
| 6,146,498 A * | 11/2000 | Hsu | D21J 3/04 |
| | | | 162/189 |
| 6,214,163 B1 | 4/2001 | Matsuda et al. | |
| 6,214,166 B1 * | 4/2001 | Munchow | D21F 1/66 |
| | | | 162/189 |
| 6,260,511 B1 * | 7/2001 | Hsu | A01K 1/0155 |
| | | | 119/171 |
| 6,413,591 B1 * | 7/2002 | Dettling | D21H 19/74 |
| | | | 162/136 |
| 6,451,884 B1 | 9/2002 | Cowen et al. | |
| 6,608,121 B2 | 8/2003 | Isozaki et al. | |
| 7,655,112 B2 | 2/2010 | Koslow | |
| 8,157,958 B2 | 4/2012 | Duarte Villa et al. | |
| 8,268,424 B1 | 9/2012 | Suzuki et al. | |
| 8,372,320 B2 | 2/2013 | Gardner et al. | |
| 8,747,612 B2 | 6/2014 | Heskanen et al. | |
| 2004/0020616 A1 * | 2/2004 | Dahlblom | D21F 1/66 |
| | | | 162/189 |
| 2005/0118419 A1 * | 6/2005 | Kwon | D01F 6/14 |
| | | | 428/364 |
| 2005/0181206 A1 * | 8/2005 | Endo | D01F 1/09 |
| | | | 428/364 |
| 2006/0012072 A1 | 1/2006 | Hagewood et al. | |
| 2008/0265222 A1 | 10/2008 | Ozersky et al. | |
| 2009/0308551 A1 * | 12/2009 | Kokko | D21H 13/20 |
| | | | 162/146 |
| 2010/0009168 A1 * | 1/2010 | Raukola | D21H 19/826 |
| | | | 428/326 |
| 2010/0059191 A1 | 3/2010 | Garcia Melgarejo et al. | |
| 2010/0065236 A1 | 3/2010 | Henriksson et al. | |
| 2010/0291183 A1 | 11/2010 | Farrell et al. | |
| 2011/0030907 A1 * | 2/2011 | Nakamoto | D21C 5/027 |
| | | | 162/5 |
| 2011/0192558 A1 * | 8/2011 | Taylor | D21C 5/027 |
| | | | 162/5 |
| 2011/0315333 A1 | 12/2011 | Vyorykka et al. | |
| 2012/0055642 A1 | 3/2012 | Lahtinen | |
| 2012/0107480 A1 | 5/2012 | Gane et al. | |
| 2012/0214979 A1 | 8/2012 | Heiskanen et al. | |
| 2012/0245257 A1 | 9/2012 | Fascio | |
| 2013/0131193 A1 | 5/2013 | Gane et al. | |
| 2014/0069302 A1 | 3/2014 | Saastamoinen et al. | |
| 2015/0075406 A1 * | 3/2015 | Nemoto | B01D 39/18 |
| | | | 106/164.01 |
| 2015/0125658 A1 | 5/2015 | Bilodeau et al. | |
| 2015/0291752 A1 | 10/2015 | Sumnicht et al. | |
| 2015/0291786 A1 * | 10/2015 | Sumnicht | D21H 13/16 |
| | | | 521/97 |

FOREIGN PATENT DOCUMENTS

| | | | | |
|---|---|---|---|---|
| CA | 2313213 A1 | 1/2001 | | |
| CA | 2678313 A1 | 3/2010 | | |
| CA | 2676961 A1 | 2/2011 | | |
| CN | 102482850 A | 5/2012 | | |
| EP | 0097371 A1 | 1/1984 | | |
| EP | 0520297 A1 | 12/1992 | | |
| EP | 1219744 A1 | 7/2002 | | |
| EP | 1817455 A1 | 8/2007 | | |
| EP | 2292815 A1 | 3/2011 | | |
| EP | 2305749 A1 | 4/2011 | | |
| EP | 2386683 A1 | 11/2011 | | |
| EP | 2520709 A1 | 11/2012 | | |
| EP | 2520710 A1 | 11/2012 | | |
| GB | 2467392 A * | 8/2010 | | C08J 5/045 |
| JP | 1060207 | 3/1998 | | |
| JP | 2001020135 A | 1/2001 | | |
| WO | 9426513 A1 | 11/1994 | | |
| WO | 0210279 A1 | 2/2002 | | |
| WO | 2011051882 A1 | 5/2011 | | |
| WO | 2013098480 A1 | 7/2013 | | |
| WO | 2013188739 A1 | 12/2013 | | |

OTHER PUBLICATIONS

Perng, Yuan-Shing, et al.; "Optimization of Handsheet Greaseproof Properties: The Effects of Furnish, Refining, Fillers, and Binders"; Perng and Wang; vol. 7, No. 3; p. 3895-3909; 2012.

Serizawa, Takeshi, et al.; "Cell-Compatible Properties of Calcium Carbonates and Hydroxyapatite Deposited on Ultrathin Poly(vinyl alcohol)-Coated Polyethylene Films"; J. Biomater. Sci. Polymer Edn.; vol. 14, No. 7; p. 653-663; 2003.

Trufakina, L.M.; "Utilization of Polymeric Composites with Fillers Made of Reproducible Natural Raw Material"; Russian Journal of Applied Chemistry; vol. 84, No. 11; p. 1936-1939; 2011.

Baheti, Vijay, et al.; "Reinforcement of Wet Milled jute Nano/Micro Particles in Polyvinyl Alcohol Films"; Fibers and vol. 14, No. 14; p. 133-137; 2013.

Baxter, George; "Carbonless Copying Papers"; Environmental Aspects of Chemical Use in Printing Operations; Office Toxic Substances Environmental Protection Agency; p. 426-446; 1976.

Lvov, Yuri M., et al.; "Nano-Micro-Macro Integration for New Cellulose Based Materials";62nd Southwest Regional of American Chemical Society; 1 page; Oct. 19-22, 2006.

Ridgway, Cathy J., et al.; "Size-Selective Absorption and Adsorption in Anionic Pigmented Porous Coating Structures: Study Cationic Starch Polymer Versus Nanofibrillated Cellulose"; Cellulose; vol. 20; p. 933-951; 2013.

Wendler, Frank, et al.; "Cellulose Products from Solutions: Film, Fibres and Aarogels"; The European Polysaccharide of Excellence (EPNOE); p. 153-185; 2012.

International Search Report and Written Opinion dated Jun. 11, 2015 for Application No. PCT/US2015024512.

International Search Report and Written Opinion dated Jul. 3, 2015 for Application No. PCT/US2015/024507.

Auer, G., et al., "Pigments, Inorganic, 2. White Pigments," Ullmann's Encyclopedia of Industrial Chemistry, published online 2009, 36 pages.

International Search Report and Written Opinion dated Oct. 20, 2016 for Application No. PCT/US2015024507.

International Search Report and Written Opinion dated Oct. 20, 2016 for Application No. PCT/US2015024512.

Machine translation of JPH1060207, 1998, performed on Espacenet on May 24, 2016.

* cited by examiner

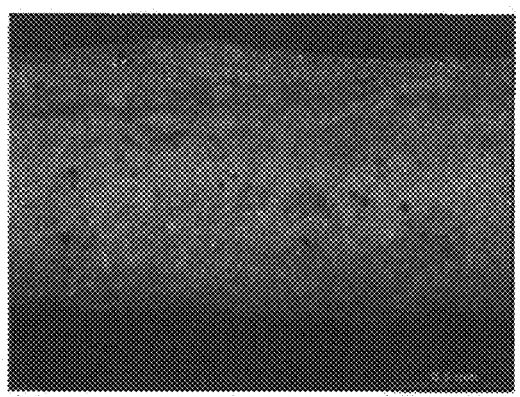 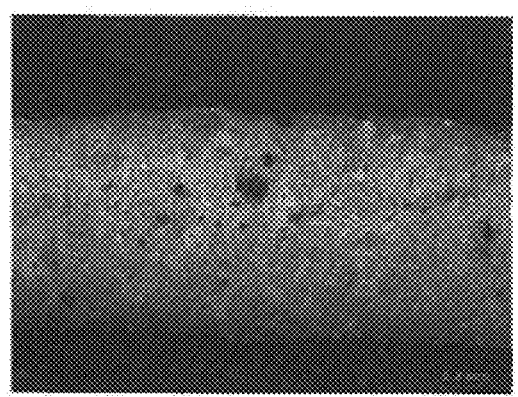
FIG. 2A                    FIG. 2B

FIBERS WITH FILLER

CROSS-REFERENCE TO RELATED APPLICATION

This application is based on U.S. Provisional Application No. 61/978,323, filed Apr. 11, 2014, which is incorporated herein in its entirety.

TECHNICAL FIELD

The present invention is directed generally to fibers, films and papers. More specifically, the present invention is related to fibers, films, and papers with filler.

BACKGROUND OF THE INVENTION

Paper recycling is the process of converting waste paper into usable paper products. Paper recycling benefits the environment and society by reducing the need to cut down trees for virgin pulp. "Deinking" is a type of industrial paper recycling process in which printing ink and other contaminants are removed from recycled papers to produce "deinked pulp," which can be used to produce paper products such as tissues.

About two-thirds of recycled paper provides usable fiber, with the remaining one-third being waste solids, or "sludge." Waste solids include about 50% ash from paper fillers and 50% small cellulosic particles referred to as "fines." Other contaminants include ink particles and "stickies" such as pressure-sensitive adhesives. Waste solids are not suitable for paper products due to their small size and dark ink particles that prevent the fillers from being directly reused. Conventionally, waste solids are discarded by various methods, including landfilling, incinerating, and dispersing on land. However, the cost of landfilling has increased over time. Further, increased focus on environmental sustainability has led to disapproval of landfilling by some organizations. Subsequently, many customers require certifications of environmental sustainability from paper product companies.

Based on the foregoing, there exists a need for practical applications of rejected wastepaper materials, such as waste solids. Accordingly, it is to solving this and other needs the present invention is directed.

SUMMARY OF THE INVENTION

The present invention is directed to an article of manufacture. In one aspect, the article is a fiber or a film. In accordance with the present invention, the article includes a binder and a filler. The binder is a polyvinyl alcohol (PVOH), cellulose nanofibrils, or a combination of the PVOH and cellulose nanofibrils, and the filler is deinking waste solids comprising ash and cellulose fines. The binder can be impregnated with the filler, or the binder can encapsulate the filler. In one aspect, a paper web includes the article. Optionally, processing aids, for example carboxymethylcellulose, are included.

In another aspect, an article of manufacture includes cellulose nanofibrils and a filler. The filler is deinking waste solids having ash and cellulose fines, and the cellulose nanofibrils are at least one of a nanofibrillated cellulose or a cellulose fibrid. The cellulose nanofibrils can be impregnated with the filler, or the cellulose nanofibrils can encapsulate the filler. The article can be a fiber or a film.

In yet another aspect, an article of manufacture includes a PVOH and a filler. The PVOH is present in a range between about 20 wt. % to about 85 wt. % based on the total fiber weight. The filler is deinking waste solids comprising ash and cellulose fines. The article can be a fiber or a film.

Yet, in another aspect, a film comprises a binder, a filler, and, optionally, wood pulp fibers. The binder is a PVOH, cellulose nanofibrils, or a combination of the PVOH and cellulose nanofibrils, and the filler is deinking waste solids comprising ash and cellulose fines.

Still yet, in another aspect, a method of making an article of manufacture includes impregnating or encapsulating a binder with a filler, and preparing an extrudable dope. The filler is deinking waste solids having ash and cellulose fines, and the binder is a PVOH, cellulose nanofibrils, or a combination of the PVOH and cellulose nanofibrils. The article can be a fiber or a film.

It is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the present invention. It is important, therefore, that the claims be regarded as including such equivalent constructions insofar as they do not depart from the spirit and scope of the present invention.

Other advantages and capabilities of the invention will become apparent from the following description taken in conjunction with the examples showing aspects of the present invention.

BRIEF DESCRIPTION OF THE DRAWINGS

The invention will be better understood and the above object as well as objects other than those set forth above will become apparent when consideration is given to the following detailed description thereof. Such description makes reference to the annexed drawings wherein:

FIGS. 2A and 2B are photomicrographs of fibers comprising a filler of waste solids and a binder of nanofibrillated cellulose (Example 1);

DETAILED DESCRIPTION OF THE INVENTION

Figure 1:
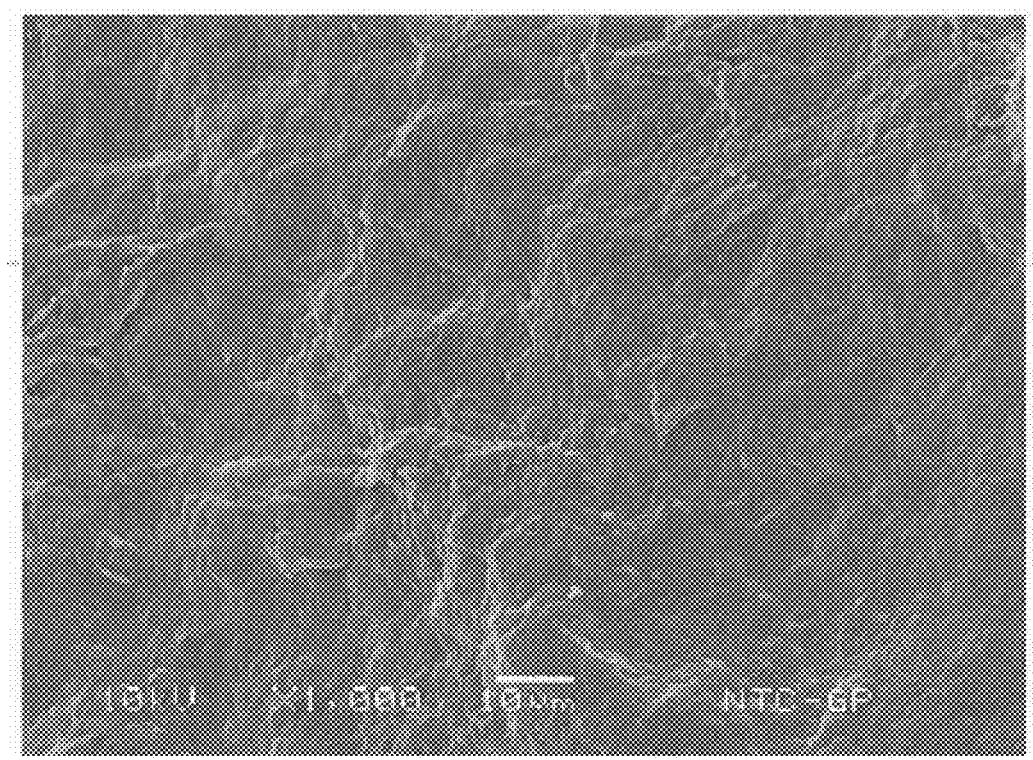
FIG. 1 is a photomicrograph of the surface of dried nanofibrillated cellulose.

For a fuller understanding of the nature and desired objects of this invention, reference should be made to the above and following detailed description taken in connection with the accompanying figures. When reference is made to the figures, like reference numerals designate corresponding parts throughout the several figures.

Terminology used herein is given its ordinary meaning consistent with the exemplary definitions set forth immediately below; mg refers to milligrams and $m^2$ refers to square meters, and so forth. Unless otherwise specified, % means weight percent.

The terms "article of manufacture" or "article" as used herein means fibers, films, and other shaped objects. The articles of manufacture include a binder and a filler. The binder is a polyvinyl alcohol (PVOH), cellulose nanofibrils, or a combination of the PVOH and cellulose nanofibrils. The filler is deinking waste solids comprising ash and cellulose fines.

The term "fiber" as used herein means an article in which the length to diameter ratio is greater than about 10. Alternatively, a fiber can have an average diameter in a range between about 10 and about 300 micrometers.

The term "film" as used herein means an article which is a thin, flexible strip. A film can have an average thicknesses in a range between about 10 and about 200 micrometers.

The terms "wood pulp" and "pulp" as used herein refer to a cellulosic material obtained from wood produced according to a chemical pulping process including, but not limited to, sulfite pulping, kraft pulping, polysulfide pulping, and soda pulping processes. Non-limiting examples of wood pulps include hardwood kraft pulp, softwood kraft pulp, hardwood sulfite pulp, softwood sulfite pulp, or any combination thereof. The cellulose fibers of the present invention can be derived from any type of wood pulp. The pulp can be bleached by chemical means, for example by chlorine dioxide, oxygen, alkaline peroxide and so forth.

The term "papermaking fibers" as used herein includes virgin pulp derived fibers, recycled (secondary) cellulosic fibers, and fiber mixes comprising cellulosic fibers. Suitable papermaking fibers include, but are not limited to: nonwood fibers, such as cotton fibers or cotton derivative fibers, abaca fibers, kenaf fibers, sabai grass fibers, bamboo, flax fibers, esparto grass fibers, straw fibers, jute hemp fibers, bagasse fibers, milkweed floss fibers, and pineapple leaf fibers; and wood fibers, such as those obtained from deciduous and coniferous trees, including softwood fibers, such as northern and southern softwood Kraft fibers; hardwood fibers, such as eucalyptus fibers, maple fibers, birch fibers, aspen fibers, and the like.

Kraft softwood fiber is low yield fiber made by the Kraft (sulfate) pulping process from coniferous material and includes northern and southern softwood Kraft fiber, Douglas fir Kraft fiber and so forth. Kraft hardwood fiber is made by the Kraft process from hardwood sources, e.g., eucalyptus. Naturally occurring pulp-derived fibers are referred to herein simply as "pulp-derived" papermaking fibers. The fibers, films, papers, and products of the present invention can include blends of conventional fibers (derived from virgin pulp or recycled sources).

The term "tissue furnish" as used herein refer to aqueous compositions including fibers of this invention, cellulose fibers, papermaking fibers, or any combination thereof. Optionally, tissue furnishes include wet strength resins, debonders and the like for making paper products.

The term "waste paper" as used herein refers to paper or cardboard which, after use, is recovered in the form of recycled fiber and then re-used to produce paper, cardboard, or paper products for some other industrial purpose. "Recycled" fiber thus refers to fiber material that has previously been used in a paper or cardboard product.

The term "cellulose nanofibril" as used herein means "nanofibrillated cellulose" (NFC), "microfibrillated cellulose" (MFC), cellulose fibrids, fibrillated lyocell, or any combination thereof. As used herein, the terms NFC and MFC are used interchangeably. Cellulose nanofibrils are derived from plant cell walls, which comprise microfibrils or nanofibrils composed of individual cellulose chains. The microfibrils or nanofibrils can be isolated, which is described below, as collections or bundles of individual, isolated cellulose microfibrils or nanofibrils. Cellulose nanofibrils can comprise hardwood kraft pulp, softwood kraft pulp, hardwood sulfite pulp, softwood sulfite pulp, or any combination thereof. MFC and NFC can have average lengths in a range between about 300 nanometers (nm) to about 4,500 nm. In addition, MFC and NFC can have average diameters in a range between about 3 nm to about 100 nm. The aspect ratio is about 100 to about 150. An important property of NFC, enabling it to function as a binder, is its ability to bond to tightly to itself upon drying that it does not redisperse into individual nanofibrils upon rewetting.

The term "cellulose fibrid" as used herein means fine cellulose fibers produced by regenerating cellulose (described in detail below). Cellulose fibrids can have average lengths in a range between about 300 nm to about 4,500 nm. In addition, cellulose fibrids can have average diameters in a range between about 3 nm to about 100 nm. The aspect ratio is about 100 to 150.

The term "fibrillated lyocell" as used herein means a cellulose fiber obtained first by an organic solvent spinning process followed mechanical treatment that results in cellulose nanofibrils. The organic solvent comprises a mixture of organic chemicals and water, and the solvent spinning process involves dissolving cellulose in the organic solvent to form a solution which is pumped through spinnerets to produce fibers without formation of a derivative of the cellulose.

The term "filler" as used herein means deinking "waste solids" derived from secondary, recycled paper. The terms "deinking" or "deinked" refer to a type of industrial paper recycling process in which printing ink and other contaminants are removed from recycled papers to produce deinked pulp and waste solids. The terms deinking "waste solids" or "sludge" refer to the conventionally unusable portion of deinked papers, which comprise predominantly an ash and a non-ash component (cellulose fines).

The term "ash" as used herein means the inorganic portion of the waste solids that remain after oxidation at high temperatures, for example 525° C. Ash is composed of discarded paper fillers such as precipitated calcium carbonate and the inorganic portion of some paper coatings such as kaolin clay. Organic components of the waste solids such as cellulose fines, polymers, inks, adhesives and the like are consumed at high temperatures, for example 525° C.

The term "binder" as used herein means any cellulosic particles in the form of cellulose nanofibrils, such as cellulose nanofibrils from cellulose fibers or cellulose fibrids, which forms a solid upon drying that is no longer dispersible in water as a fibril. When cellulose nanofibrils are used as the binder, other processing aids such as carboxymethyl cellulose may used. Polyvinyl alcohol (PVOH) is another binder that is initially water soluble but can be made nearly or completely insoluble through after-treatment that may include heat treatment, heat stretching or reversion of alcohol groups to acetate groups through formalization. The combination of a binder and a filler can be used to form fibers and films. Further, a mixture of a filler and a binder can be applied to or incorporated within a paper.

The term "degree of polymerization" (DP) as used herein means the number of monomeric units in a polymer. For a homopolymer, such as PVOH, there is only one type of monomeric unit; thus, the number-average DP is given by $M_n/M_0$. $M_n$ is the average molecular weight of the polymer, and $M_0$ is the molecular weight of the monomer unit.

The term "degree of hydrolysis" as used herein means the proportion of acetate groups in polyvinyl acetate that have been converted to alcohol groups to form the polyvinyl alcohol.

The terms "extrudable dope" and "extrudable spin mass" as used herein are used interchangeably and means a composition including a binder, a filler, and optionally, a processing aid, that can be extruded through an orifice, such as a spinneret to form shaped articles of manufacture, for example fibers and films. The binder is a polyvinyl alcohol (PVOH), cellulose nanofibrils, or a combination of the PVOH and cellulose nanofibrils, and the filler is deinking waste solids comprising ash and cellulose fines.

Paper used for manufacturing various types of printed matter, such as newspapers, magazines, free sheet and other paper, can include a plurality of additives. The additives can be coatings, fillers, pigments, and colorants, and the relative proportions of the various additives vary depending on the type of printing paper.

When recovering recycled fiber from recycled, printed paper (waste paper), the paper is subjected to a cleaning process in order to decolor and deink the fibers and remove impurities. Waste paper typically provides about two thirds usable fiber. The remaining one-third of various rejects is then combined to produce deinking "waste solids," or "sludge," with relatively high water content. "Ashing" refers to the process of heating to high temperature (for example 525° C.). Conventionally, the waste solids are landfilled, incinerated, spread on land, or discarded by various other methods. Over time, however, landfilling becomes costly. Further, in view of environmental sustainability, landfilling can be undesirable. Thus, incorporation of waste solids into a usable fiber is beneficial.

Binders, such as PVOH or cellulose nanofibrils, can be combined with waste solids (as a filler) to form articles of manufacture, including fibers, films, or other shaped objects. Because they include recycled materials, the articles will have a darker color compared to other fibers, films, or shaped objects that utilize virgin materials. While waste solids would be retained at a low percentage of a tissue furnish due to their small size, filled fibers of the present invention can be retained at a very high rate in papers, such as tissues, or other products. In addition, waste solids can be directly incorporated into paper products by including the waste solids with binders in the tissue furnish. Alternatively, the waste solids can be combined with binder and then disposed onto the surface the paper product. In yet another alternative, waste solids can be incorporated into a binder, formed into a dried film, and ground to a particle size that can be retained in a paper web. Paper webs and paper products include, but are not limited to, tissues, bath tissue, napkins, paper towels, facial tissues, filter paper, and the like.

As described herein, the present invention provides an article of manufacture including a binder and a filler. The article can be a fiber or a film. The binder can be impregnated with the filler, or the binder can encapsulate the filler. The binder is a polyvinyl alcohol (PVOH), cellulose nanofibrils, or a combination of the PVOH and cellulose nanofibrils, and the filler is deinking waste solids comprising predominantly ash and cellulose fines.

In one aspect, an article of manufacture, which can be a fiber or a film, includes cellulose nanofibrils and a filler. The cellulose nanofibril is impregnated with the filler, or the cellulose nanofibrils encapsulate the filler. The filler is deinking waste solids comprising ash and cellulose fines, and the cellulose nanofibrils are at least one of a nanofibrillated cellulose or a cellulose fibrid.

In another aspect, an article of manufacture includes a PVOH and a filler. The article can be a fiber or a film. The PVOH is present in a range between about 20 wt. % to about 85 wt. % based on the total fiber weight, and the filler is deinking waste solids comprising ash and cellulose fines. The article can be a fiber or a film.

The average diameter of the fibers of the present invention can be any diameter, depending on the application. In one aspect, the fibers have an average diameter of less than about 300 micrometers. In another aspect, the fibers have an average diameter in a range between about 100 micrometers to about 250 micrometers. Yet, in another, aspect, the fibers have an average diameter in a range between about 50 micrometers to about 100 micrometer. Yet, in another, aspect, the fibers have an average diameter in a range between about 10 micrometers to about 50 micrometers. Still, in another aspect, the fibers have an average diameter about or in the range between about 10, 20, 30, 40, 50, 60, 70, 80, 90, 100, 110, 120, 130, 140, 150, 160, 170, 180, 190, 200, 210, 220, 230, 240, 250, 260, 270, 280, 290, and 300 micrometers.

Filler

The ash portion of waste solids includes deinking residuals such as paper fillers. The ash can include, but is not limited to, precipitated calcium carbonate, ground calcium carbonate, gypsum, titanium dioxide, clay, silica, magnesium aluminum silicate, hydrated aluminum silicate, barium silicate, calcium silicate, magnesium silicate, strontium silicate, talc, mica, kaolin clay, sericite, muscovite, lepidolite, biotite, vermiculite, zeolite, barium sulfate, calcined calcium sulfate, hydroxyapatite, ceramic powder, colloidal silicone dioxide, boron nitride, or any combination thereof.

The non-ash portion of waste solids includes cellulose fines, which refer to small cellulose particles having a length in a range between about 20 to about 200 microns. In another aspect, the cellulose fines can have an average diameter in a range between about 1 micrometer to about 40 micrometers. Yet, in another aspect, the cellulose fines have an average diameter about or in a range between about 1, 10, 20, 30, 40, 50, 60, 70, 80, 90, 100, 110, 120, 130, 140, 150, 160, 170, 180, 190, and 200 micrometers. The ash portion of the filler can include particles having an average size of less than about 20 micrometers in diameter. In one aspect, the filler includes particles having an average diameter in a range between about 0.5 micrometer to about 18 micrometers. In another aspect, the filler includes particles having an average diameter in a range between about 1 micrometer to about 5 micrometers. Yet, in another aspect, the filler includes particles having an average diameter about or in a range between about 0.5, 1, 2, 3, 4, 5, 6, 7, 8, 9, 10, 11, 12, 13, 14, 15, 16, 17, and 18 micrometers.

The filler can be present in the fiber in a range between about 1 wt. % to about 80 wt. % based on the total weight of the fiber. In another aspect, the filler is present in a range between about 5 wt. % to about 50 wt. % based on the total weight of the fiber. Yet, in another aspect, the filler is present in a range between about 20 wt. % to about 60 wt. % based on the total weight of the fiber. Still yet, in another aspect, the filler is present in a range between about 30 wt. % to about 50 wt. % based on the total weight of the fiber. Still, in another aspect, the filler is present in an amount about or in a range between about 1, 2.5, 5, 7.5, 10, 12.5, 15, 17.5, 20, 25, 30, 35, 40, 42.4, 45, 47.5, and 50 wt. % based on the total weight of the fiber.

The physical properties of the binder of the present invention (cellulose nanofibrils and PVOH) enable formation of a solid article upon combination with fillers. The subsequent articles have limited solubility upon drying and after treatment. In particular, the articles can dry into fibers, films, or other shaped objects. When combined with waste solids, the binders can trap, encapsulate, and bind small particles in waste solids as the dope is extruded through spinnerets to form the articles. The fibers and films remain substantially in their shaped state when immersed in water or an aqueous environment. The objects can then be readily formed, retained, and bonded into a paper web.

As indicated above, an article of the present invention includes a binder and a filler. The binder is PVOH, cellulose nanofibrils, or a combination of PVOH and cellulose nanofibrils, and the filler is deinking waste solids comprising ash, cellulose fines, and a wood pulp fiber. The binder can be impregnated with the filler, or the binder can encapsulate the filler. In one aspect, the article is a film. The films can have any average thickness, which depends on the application. In one aspect, the films have an average thickness in a range between about 10 micrometers to about 200 micrometers. In another aspect, the films have an average thickness in a range between about 50 micrometers to about 150 micrometers. Yet in another aspect, the films have an average thickness in a range between about 40 micrometers to about 100 micrometers.

Fibers of the present invention can be used to form paper webs. In another aspect of the present invention, a paper web has a cellulosic substrate having a surface, and the article of the present invention is substantially disposed onto the surface of the substrate. Alternatively, the article can impregnate the cellulosic substrate. The article can be formed by forming a mixture including a filler and a binder. The filler is deinking waste solids, and the binder is a PVOH, cellulose nanofibrils, or a combination of the PVOH and cellulose nanofibrils. The mixture is dried and ground to a particle size having an average diameter in a range between about 1 and about 80 micrometers.

Nanofibrillated Cellulose

Cellulose nanofibrils, including NFC, can be combined or mixed with the filler (waste solids) and any suitable additives or processing aids to form a dope. NFC can be isolated by mechanical disintegration of the plant cell wall in wood pulp. In addition to mechanical force, various chemical pre-treatments, such as strong hydrolysis, can be used. Mechanical disintegration of NFC from cellulose raw material, cellulose pulp, wood pulp, or refined pulp is carried out with any suitable equipment, such as a refiner, a grinder, a homogenizer, a colloider, a friction grinder, an ultrasound sonicator, a fluidizer, such as a micro fluidizer, a macro fluidizer or a fluidizer-type homogenizer. U.S. Patent Pub. No. 2012/0214979 A1 to Heiskanen et al. (now U.S. Pat. No. 8,747,612), which is incorporated herein in its entirety by reference, discloses an exemplary method for isolating NFC.

NFC also can be chemically or physically modified to form a derivative of cellulose or micro fibril bundles. The chemical modification can be based, for example, on carboxymethylation, oxidation, esterification, or etherification reactions of cellulose molecules. Modification also is accomplished by physical adsorption of anionic, cationic, non-ionic substances, or any combination of thereof, onto the cellulose surface. The described modifications can be carried out before, after, or during the production of NFC.

Any of the above described methods for producing cellulose nanofibrils can be used in the present invention. In addition, any other suitable method known in the art can be used to produce the cellulose nanofibrils.

Cellulose Fibrids

Cellulose fibrids can be produced by regenerating cellulose, for example, by initially dissolving cellulose or a cellulose derivative in a solvent to produce a cellulose dope. Following dissolution in a suitable solvent, mixing in a high-shear mixer can produce finely dispersed cellulose fibrids. These fibrids, like NFC, are fine enough that they form films, and other structures, that do not re-disperse upon wetting in water. Cellulose fibrids can be combined and mixed with waste solids and any suitable additives or processing aids to form a dope. Subsequently, the dope can be extruded through spinnerets to form the fibers and films.

Exemplary methods of forming cellulose fibrids are disclosed in U.S. Pat. No. 2,999,788 to Morgan and U.S. Pat. No. 6,451,884 to Cowen et al., both of which are incorporated herein in their entirety by reference. As disclosed in U.S. Pat. No. 2,999,788, cellulosic fibrids can be made by mixing a spinning solution of cellulose and coagulating liquor together under turbulent conditions. One example of such a spinning solution is viscose, which contains sodium cellulose xanthate. Examples of coagulating liquors for viscose include, but are not limited to, aqueous salt solutions and aqueous acid solutions.

Canadian Patent No. CA 2,313,213, which is incorporated herein in its entirety by reference, describes an exemplary method of fibrid production using shear coagulation of a cellulose dope made with N-methylmorpholine N-oxide (NMMO or NMMNO). Briefly, a method of producing reactive fiber-like cellulose coagulates comprises steps of providing a solution of cellulose in a mixture containing water and NMMO, and then treating the solution in a precipitation bath containing water and NMMO with a shear field. The method has the advantage that no stretching or drawing in air in another non-precipitating medium is required for orienting the cellulose molecules along the fiber axis. Instead, the coagulates can directly be obtained in a precipitation path using a shear field generator. The shear field can be produced by surfaces that are closely arranged side by side and are movable relative to one another.

A method for dissolving cellulose to produce a cellulose dope is disclosed in U.S. Pat. No. 4,246,221 to McCorsley, which is incorporated herein in its entirety by reference. In addition, cellulose can be dissolved in a solution of a tertiary amine N-oxide to produce a dope. One process for dissolving cellulose in a tertiary amine N-oxide is disclosed, for example, U.S. Pat. No. 2,179,181 to Graenacher et al., which is incorporated herein in its entirety by reference. In accordance with the disclosure, oxides of trimethylamine, triethylamine, tripropylamine, monomethyldiethylamine, dimethylmonoethylamine, monomethyldipropylamine, N-dimethyl-, N-diethyl- or N-dipropylcyclohexylamine, N-dimethylmethylcyclohexylamine and pyridine can be used. U.S. Pat. No. 3,447,939 to Johnson discloses a process for dissolving cellulose in an anhydrous tertiary amine N-oxide, which is incorporated herein in its entirety by reference. A cyclic mono (N-methylamine-N-oxide) compound, such as NMMO is used as the solvent.

Any of the above described methods for producing cellulose fibrids can be used in the present invention. In addition, any other suitable method known in the art can be used to produce the cellulose fibrids.

Any of the above mentioned cellulose nanofibrils of the present invention can have an average length of less than about 800 micrometers. In another aspect, the cellulose nanofibrils have an average length in a range between about 300 micrometers to about 700 micrometers. Yet, in another aspect, the cellulose nanofibrils have an average length in a range between about 100 micrometers to about 500 micrometers. Still yet, in another aspect, the cellulose nanofibrils have an average length of less than about 200 micrometers. In one aspect, the cellulose nanofibrils have an average length about or in a range between about 100, 150, 200, 250, 300, 350, 400, 450, 500, 550, 600, 650, 700, 750, and 800 micrometers.

Any of the cellulose nanofibrils can be present in the articles of the present invention, which can be fibers or films, in a range between about 1 wt. % to about 80 wt. % based on the total weight of the article. In another aspect, the cellulose nanofibrils can be present in the article in a range between about 5 wt. % to about 70 wt. % based on the total weight of the article. Yet, in another aspect, the cellulose nanofibrils can be present in a range between about 20 wt. % to about 50 wt. % based on the total weight of the article. Still, in another aspect, the cellulose nanofibrils can be present in an amount about or in a range between about 1, 5, 10, 15, 20, 25, 30, 35, 40, 45, 50, 55, 60, 65, 70, 75, and 80 wt. % based on the total weight of the article.

PVOH

The PVOH can have an average degree of polymerization in a range between about 500 to about 3,000. In one aspect, the PVOH has an average degree of polymerization in a range between about 1,000 to about 1,600. Yet, in another aspect, the PVOH has an average degree of polymerization of about 1,400. Still, in another aspect, the PVOH has an average degree of polymerization about or in a range between about 500, 750, 1000, 1250, 1350, 1400, 1500, 1600, 1700, 2000, 2500, and 3000.

The PVOH can have an average degree of hydrolysis of greater than about 95%. In another aspect, PVOH has an average degree of hydrolysis of greater than about 98%. Yet, in another aspect, the PVOH has an average degree of hydrolysis in a range between about 95% to about 99%. Still, in another aspect, the PVOH has an average degree of hydrolysis about or in a range between about 95, 96, 97, 98, 99, or 100%.

The PVOH can be present in the article in a range between about 20 wt. % to about 80 wt. % based on the total weight of the article. The article can be a fiber or a film. In one aspect, the PVOH is present in a range between about 20 wt. % to about 99 wt. %. Yet, in another aspect, the PVOH is present in a range between about 40 wt. % to about 60 wt. %. Still yet, in another aspect, the PVOH can be present in a range between about 20 wt. % to about 99 wt. %. In another aspect, the PVOH is present in an amount about or in a range between about 20, 25, 30, 35, 40, 45, 50, 55, 60, 65, 70, 75, 80, 85, 90, 95, and 99 wt. %.

In one aspect, articles of the present invention are in the form of fibers. In another aspect, articles are in the form of fibrids. PVOH fibrids can be produced by mixing PVOH with filler to form a spin mass and then treating the spin mass with a shear field in a coagulation bath such as saturated sodium sulfate solution to form the PVOH fibrids. For example, the method disclosed above in CA 2,313,213 for cellulose fibrids can be used to produce filled PVOH fibrids. Filled PVOH fibrids can have an average length of about 200 to about 2500 microns. In another aspect, filled PVOH fibrids can have an average length of about 600 to about 2000 microns. In yet another aspect, filled PVOH fibrids can have an average length of about 800 to about 1500 microns.

Processing Aids

The articles of the present invention, which can be fibers, films, or other shaped articles, can include any suitable processing aids or additives, which can aid in forming a spinnable or extrudable dope. The processing aid can be present in a range between about 0.5 wt. % to about 10 wt. %. In another aspect, the additive can be present in the spin mass in a range between about 0.3 wt. % to about 5 wt. %. In yet another aspect, the additive can be present in a range between about 0.5 wt. % to about 2 wt. %. Still, in another aspect, the processing aids are present in an amount about or in a range between about 0.1, 0.2, 0.5, 0.7, 1.0, 1.5, 2.0, 2.5, 3.0, 3.5, 4.0, 4.5, and 5.0 wt. %. Non-limiting examples of suitable processing aids include carboxymethylcellulose, starch, glyoxal, glutaraldehyde, boric acid carbonate, zirconium ammonium carbonate, glyoxalated polyacrylamide, polyamide-epichlorohydrin, polyamine-epichlorohydrin, urea-formaldehyde, melamine-formaldehyde, polyethyleneimine, propylene glycol, diethylene glycol, triethylene glycol, dipropylene glycol, glycerol, triacetin (glycerol triacetate), diethylene glycol diacetate, triethylene glycol diacetate, tripropionin, acetyl triethyl citrate, triethyl citrate, or any combination thereof.

Optionally, an acid can be added to the binder and filler combination to generate $CO_2$, which results in expanded fibers and can lead to bulkier paper webs. Alternatively, sodium bicarbonate can be added to generate even more $CO_2$. Optional acids include sulfuric acid, hydrochloric acid, nitric acid, phosphoric acid, or any combination thereof.

Method of Making

In accordance with the present invention, a method of making an article of the present invention includes impregnating or encapsulating a binder with a filler and then preparing an extrudable dope or spin mass. The method can be used to make fibers or films. The filler is deinking waste solids having rejected ash (or wastepaper fillers) and cellulose fines, and the binder is a PVOH, cellulose nanofibrils, or a combination of the PVOH and cellulose nanofibrils. The waste solids are produced in deinking mills where recycled papers or wood pulps are deinked, which is described above.

Initially, the binder is mixed with filler and processing aids to form an extrudable spin mass. When cellulose nanofibrils, cellulose nanocrystals, or cellulose fibrids are used as the binder, additives such as carboxymethyl cellulose may be added to increase the extensibility of the spin mass. When PVOH is the binder, the properties of the PVOH are chosen to obtain the desired rheology. The fibers can be formed from the spin mass using various methods, including, for example, wet spinning, dry spinning, shear spinning, or slit extruding. Films also can be formed by an extrusion process. In a solution spinning process, the extrudable dope is delivered to orifices of a spinneret. As one of ordinary skill in the art will understand, a spinneret refers to a portion of a fiber forming apparatus that delivers molten, liquid, or dissolved materials through orifices for extrusion into an outside environment. A spinneret includes from about 1 to about 500,000 orifices per meter of length of the spinneret. A spinneret can be implemented with holes drilled or etched through a plate, or with any other structure capable of issuing desired fibers. A film is produced by extrusion through a slot-shaped orifice.

Upon emerging from the spinneret, the binder-filler combination solidifies to form the fibers or films. In a wet solution spinning process, the spinneret can be submerged in a coagulation or spinning bath (e.g., a chemical bath), such that upon exiting the spinneret, one or more materials can precipitate and form solid fibers. The composition of the spinning bath can vary depending upon the desired application of the resulting fibers. For example, the spinning bath can be water, an acidic solution (e.g., a weak acid solution including sulfuric acid), a solution of amine oxide, or a salt bath using sodium sulfate for example. In a dry solution spinning process, one or more materials can emerge from the spinneret in warm air and solidify due to a solvent (e.g., acetone) evaporating in the warm air.

After emerging from the spinneret, fibers can be drawn or stretched utilizing a godet or an aspirator. For example, fibers emerging from the spinneret can form a vertically oriented curtain of downwardly moving fibers that are drawn between variable speed godet rolls before being wound on a bobbin or cut into staple fiber. Fibers emerging from the spinneret can also form a horizontally oriented curtain within a spinning bath and can be drawn between variable speed godet rolls. As another example, fibers emerging from the spinneret can be at least partially quenched before entering a long, slot-shaped air aspirator positioned below the spinneret. The aspirator can introduce a rapid, downwardly moving air stream produced by compressed air from one or more air aspirating jets. The air stream can create a drawing force on the fibers, causing them to be drawn between the spinneret and the air jet and attenuating the fibers. During this portion of fiber formation, one or more polymer materials forming the fibers can be solidifying.

Following extrusion from the spinnerets, the shaped fibers or films can be dried by any suitable method. For example, the fibers or films can be air-dried. Alternatively, the fibers or films can be dried in a hot air stream. These fibers can be incorporated into a paper web.

Fibers can be formed with or without additional fillers to produce unique cellulose shapes beneficial to paper properties. U.S. 2006/0012072 to Hagewood et al. discloses methods for forming various shaped fibers, which is incorporated herein in its entirety by reference.

In one aspect of the present invention, a method of making a paper comprises initially forming a mixture (or composite) of a filler and a binder. Then, the method includes incorporating the mixture into a tissue furnish (or adding the composite to the tissue furnish), forming a nascent web, and then drying the nascent web to form the paper. Alternatively, the method includes forming the nascent web, dewatering the nascent web, substantially disposing the mixture onto the surface of the nascent web, and then drying the nascent web to form the paper. The filler is deinking waste solids comprising ash and cellulose fines, and the binder is a PVOH, cellulose nanofibrils, or a combination of the PVOH and cellulose nanofibrils.

Optionally, the filled fibers are cut into short staple fibers prior to being added to the tissue furnish. One potential advantage of employing staple fibers is that a more isotropic web can be formed, since the staple fibers can be oriented in the web more randomly than longer fibers.

In another aspect, a tissue furnish comprising cellulose fibers can be deposited onto a forming surface to form a nascent web. Then, the mixture of binder and filler can be substantially disposed onto the surface of the nascent web by spraying or any suitable application method. Alternatively, the mixture can be substantially disposed onto the surface of the paper after an initial drying process. For example, the mixture can be substantially disposed, i.e., by spraying, onto the surface of the paper after drying on a Yankee dryer, but prior to drying by a second drying method.

In another aspect, filler and binder are combined to form a mixture, and then the mixture is dried and ground to an average particle size in a range between about 1 micrometer to about 80 micrometers. Yet, another aspect, the mixture is dried and ground to an average particle size in a range between about 5 micrometers to about 50 micrometers. Still yet, in another aspect, the mixture is dried and ground to an average particle size in a range between about 10 micrometers to about 25 micrometers. In one aspect, the mixture is dried and ground to an average particle size in a range between about 1, 5, 10, 15, 20, 25, 30, 35, 40, 45, 50, 55, 60, 65, 70, 75, and 80 micrometers. Then, the mixture can be added to a furnish. Retention aids can be added to the furnish if necessary. Alternatively, the mixture is spray-dried with a particle size that can be retained in a tissue furnish. A method of spray-drying is described in U.S. Pat. No. 8,372,320 to Gardner et al., which is incorporated herein in its entirety by reference.

EXAMPLES

Example 1

Fibers were prepared from an extrudable dope comprising NFC (binder), waste solids (filler), and 5 wt. % carboxymethyl cellulose (CMC). The dope was extruded with a syringe through a 20-gauge needle onto aluminum foil and dried in an oven at 105° C. FIGS. 2A and 2B illustrate images of the fibers. The fibers persisted for at least 30 minutes of light agitation in water.

Example 2

In Example 2, MOWIOL 10/98 (polyvinyl alcohol) (available from KURARAY Europe GmbH, Hattersheim am Main, Germany) (Degree of polymerization: ~1400; Molecular Weight: ~60,000 g/mol; Viscosity (4% solution in water): 10±1 mPa·s at 20° C.) was used as the standard for all spinning trials.

Deinking residuals that contain small ink particles, rejected paper fillers, and fine cellulose particles (cellulose fines) were collected from a wastepaper recycling process. Deinking residuals were ashed at 525° C. The ash was predominantly rejected paper filler, such as precipitated calcium carbonate, kaolin clay, and titanium dioxide. The non-ash component was substantially cellulose fines removed during deinking. About 99% of the filler passed through a 200 mesh screen with 76 micrometer holes. Table 1 shows some of the properties of the residuals used for filler in this example.

TABLE 1

| Filler composition | |
|---|---|
| Ash (%) | 63.3 |
| Non-ash (%) | 36.7 |
| 200 Mesh Britt jar pass (%) | 99.1 |

The filler suspension was first dewatered using standard filter paper, and then the solids level of the wet filtration cake was determined. The dewatered filler was placed in double jacket 1.5-L-glass reactor equipped with an agitator, thermometer and reflux condenser. Sufficient deionized water was added to reach the final target level of solids. The suspension was heated to 60° C. under agitation, and PVOH was added to achieve a 1:1 PVOH:filler ratio. The mixture appeared to become homogeneous with sufficient mixing at 60° C. Table 2 displays the process conditions

TABLE 2

Process conditions for wet spinning fibers

| | |
|---|---|
| Polymer | PVOH, fully hydrolysed ≥ 98% (MOWIOL 10/98) |
| Composition of spin mass: | |
| Polyvinyl alcohol | 50 g (16.7%) |
| Water | 200 g (66.7%) |
| Filler | ~50 g (16.7%) |
| Dissolution temperature | 105° C. |
| Concentration of spinning solution (dope) | 20% (w/w) relative to PVOH |
| Average degree of polymerization | 1,400 |
| Solvent | water |
| Dope temperature at spinning | 60° C. |
| Spinneret | 0.2 mm (48 holes), immersed |
| Coagulation | saturated Na$_2$SO$_4$-solution, 48° C., 2-m-spinning bath trough |
| Take-up velocity | — |
| Spin mass metering rate | 5 ml/min |

Figure 3A:
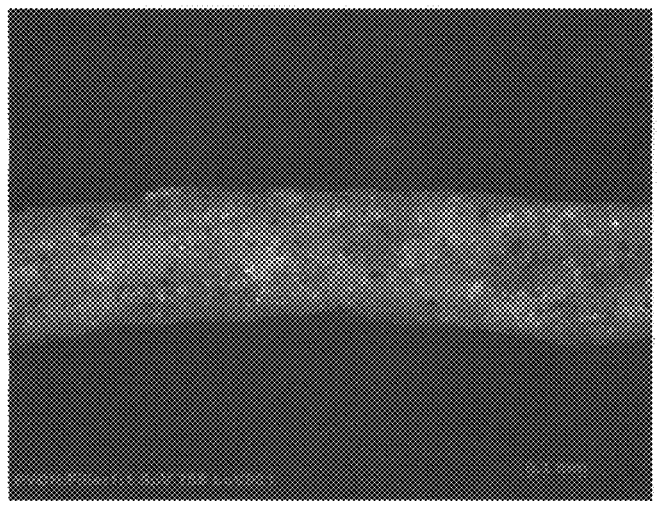
FIGS. 3A (Example 2), 3B (Example 3), and 3C (Example 4) are photomicrographs of fibers comprising a filler of waste solids and a binder of PVOH.

After wet-spinning, the fibers were allowed to dry at room temperature. Then, the fibers were annealed for 10 minutes at 200° C. (circulated air), washed with warm water at 50° C., and dried again at room temperature. FIG. 3A illustrates an image of the fiber comprising 50% PVOH and 50% filler.

Example 3

In Example 3, fibers were wet spun with PVOH and filler as described in Example 2, except with a different filler composition (Table 3). The filler composition was incorporated at a higher PVOH:filler ratio of about 2:1. In addition, larger spinnerets were used (0.5 mm). Table 4 summarizes process conditions for wet spinning fibers from the spin mass.

TABLE 3

Filler composition

| | |
|---|---|
| Ash (%) | 54.8 |
| Non-ash (%) | 45.2 |
| 200 Mesh Britt jar pass (%) | 99.4 |

TABLE 4

Process conditions for wet spinning fibers

| | |
|---|---|
| Polymer | PVOH, fully hydrolysed ≥ 98% (MOWIOL 10/98) |
| Composition of spin mass: | |
| Polyvinyl alcohol | 112 g (8%) |
| Water | 450 g (18%) |
| Filler | ~50 g (74%) |
| Dissolution temperature | 105° C. |
| Concentration of spinning solution (dope) | 20% (w/w) relative to PVOH |
| Average degree of polymerization | 1,400 |
| Solvent | water |
| Dope temperature at spinning | 60° C. |
| Spinneret | 0.2 mm (48 holes), immersed |
| Coagulation | saturated Na$_2$SO$_4$-solution, 48° C., 2-m-spinning bath trough |
| Spin mass metering rate | 5 ml/min |

Figure 3B:
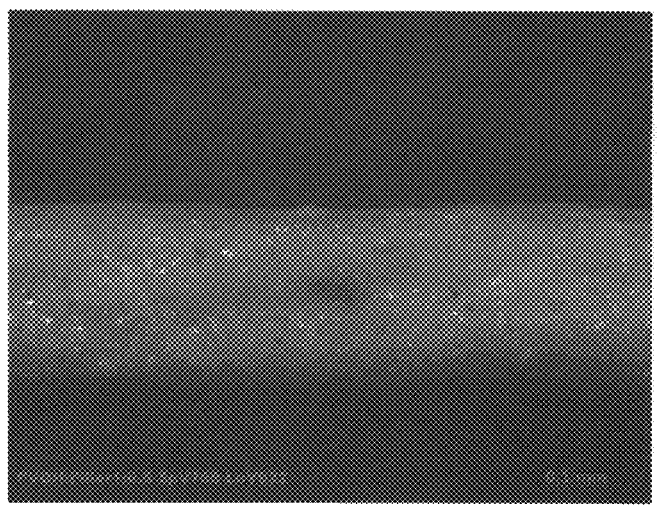

After wet-spinning, the fibers were allowed to dry at room temperature. Then, the fibers were annealed for 10 minutes at 200° C. (circulated air), washed with warm water at 50° C., and dried again at room temperature. FIG. 3B illustrates an image of the fiber comprising 69% PVOH and 31% filler.

Example 4

Figure 3C:
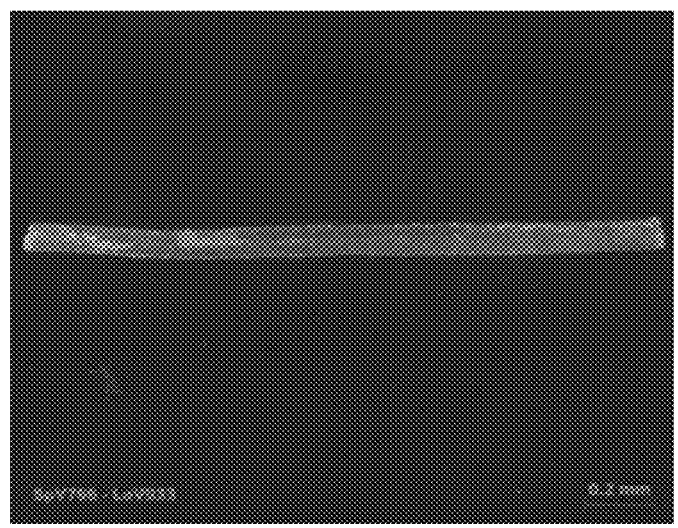

In Example 4, wet spun fibers with deinking waste solids were prepared at PVOH:filler ratio of 1:0.22 (FIG. 3C). Rejects from a deinking process were milled under the following conditions to reduce particle size. (Milling conditions: Ball mill type FRYMA MS-12; solid content: 7.5% (w/w); throughput: 270 ml/min; 2000 rpm; milling balls: 300 ml Zirconia-Silicate (0.8-1 mm); duration: 4 h (final temperature: 60° C.)).

Milled reject material was homogeneously dispersed in a quantity of tap water such that a PVOH:filler-ratio of 1:0.22 and a polymer concentration of 20% would result when PVOH is added afterwards (refer to Table 5 for composition). The slurry was transferred to a double-jacket 10-L-steel reactor equipped with an agitator, thermometer and reflux condenser. After adding the calculated quantity of PVOH chips, the suspension was allowed to swell at 60° C. for 20 minutes before the jacket temperature was raised to 98° C. After noticing complete dissolution, the formed grey solution/dispersion was agitated for 10 more minutes at 95° C. before the external heating cycle temperature was reset to 60° C. When internal temperature was lowered to about 65-70° C., the spin mass was transferred to the storage tank of the spinning apparatus. Fibers were spun according to the parameters in Table 5.

TABLE 5

Process conditions for wet spinning fibers

| | |
|---|---|
| Polymer | PVOH, fully hydrolysed ≥ 98% (MOWIOL 10/98) |
| Composition of spin mass: | |
| Polyvinyl alcohol | 380 g (27.5%) |
| Water | 917 g (66.4%) |
| Filler | ~83 g (6.0%) |
| Dissolution temperature | 95° C. (jacket heating 98° C.) |
| Concentration of spinning solution (dope) | 29% (w/w) related to PVOH |
| Average degree of polymerization | 1400 |
| Solvent | water |
| Dope temperature at spinning | 60° C. |
| Spinneret | 0.15 mm (30 holes) immersed |
| Coagulation | saturated Na$_2$SO$_4$-solution, 48° C., 2-m-spinning bath trough |
| Take-up velocity | 24 ml/min |
| Spin mass metering rate | 7.5 ml/min |

After wet-spinning, the fibers were allowed to dry at room temperature. Then, the fibers were annealed for 10 minutes at 200° C. (circulated air), washed with warm water at 50° C., and dried again at room temperature. FIG. 3C illustrates an image of the fibers comprising 82% PVOH and 18% filler.

Example 5

Figure 4:
FIG. 4 (Example 5) is a photomicrograph of a fibrid produced by shear coagulation.

The spin mass of Example 4 was formed into fibrids (FIG. 4) using shear coagulation according to the parameters in Table 6.

TABLE 6

Process conditions for shear spinning fibrids

| | |
|---|---|
| Polymer | PVOH, completely hydrolysed ≥ 98%, MOWIOL 10/98 |
| Concentration of spinning solution (dope) | 29% (w/w) |

TABLE 6-continued

Process conditions for shear spinning fibrids

| | |
|---|---|
| Average degree of polymerization | 1400 |
| Solvent | water |
| Dope temperature at spinning | 60° C. |
| Spinneret | single-hole, 1 mm, immersed |
| Composition of spin mass | |
| Polyvinyl alcohol | 380 g (27.5%) |
| Water | 917 g (66.4%) |
| Filler Reject | ~83 g (6.0%) |
| Coagulation agent | saturated aqueous $Na_2SO_4$-solution |
| Coagulation bath temperature | 45° C. |
| Forming tool | Ultra-TURRAX-tool, coarse |
| Mass ratio spin mass:co-agulation agent | 1:15 |

The treatment steps were as follows: 1) Separation from salt-solution (contact time of fibrids in salt solution about 20 min for completing coagulation, steady agitation during preparation); 2) Drying at room temperature; 3) Annealing (15 min, 200° C., at least 10 min residence time required); 4) Washing (for removal of adherent $Na_2SO_4$); 5) Final drying.

Example 6

The spin mass of Example 4 was formed into a film (FIG. 5) according to the parameters in Table 7 after adding pulp fibers obtained from a recycled dry lap pulp called Fibrek Lighthouse.

TABLE 7

Film preparation parameters

| | |
|---|---|
| Polymer | PVOH, fully hydrolysed ≥ 98%, MOWIOL 10/98 |
| Dissolution temperature | 95° C. |
| Composition of spin mass | |
| Polyvinyl alcohol | 400 g (16.6%) |
| Water | 1600 g (66.7%) |
| Filler Reject | 200 g (8.3%) |
| Pulp-Fibers | 200 g (8.3%) |
| Concentration of spinning solution (dope) | 20% (w/w) |
| Average degree of polymerization | 1400 |

Figure 5:
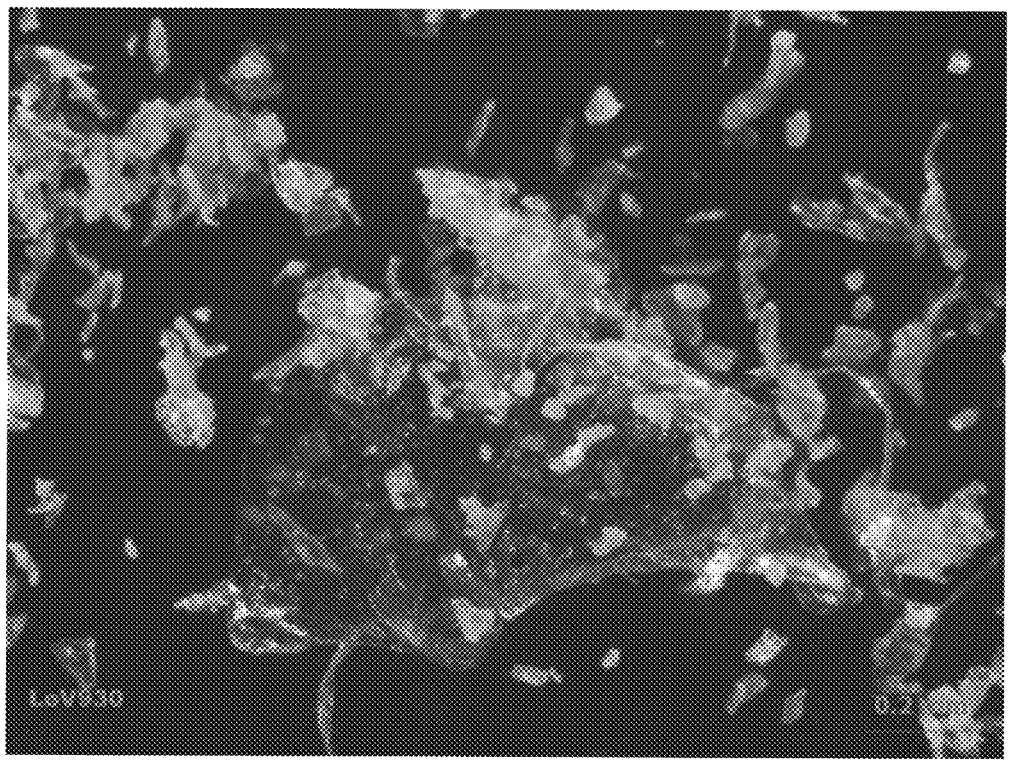
FIG. 5 (Example 6) is a photomicrograph of a milled film produced by slit extrusion comprising a filler of waste solids and wood pulp, and a binder of PVOH.

Films were prepared by means of doctor blade (50 μm slit width), which were dried at 75° C. for 15 min (FIG. 5). Subsequently, the films were removed from the support plate, annealed at 200° C. for 5 min, and milled.

With respect to the above description, it is to be realized that the optimum proportional relationships for the parts of the invention, to include variations in components, concentration, shape, form, function, and manner of manufacture, and use, are deemed readily apparent and obvious to one skilled in the art, and all equivalent relationships to those illustrated in the specification are intended to be encompassed by the present invention.

Therefore, the foregoing is considered as illustrative only of the principles of the invention. Further, various modifications may be made of the invention without departing from the scope thereof, and it is desired, therefore, that only such limitations shall be placed thereon as are imposed by the prior art and which are set forth in the appended claims.

What is claimed is:

1. An article of manufacture comprising:
a binder and a filler, the binder being cellulose nanofibrils and PVOH, and the filler being deinking waste solids comprising ash and cellulose fines;
wherein the article is a fiber or a film, and the cellulose nanofibrils and PVOH impregnate or encapsulate the deinking waste solids to form the fiber or the film, and the PVOH is present an amount in a range between about 20 wt. % to about 99 wt. % based on the total weight of the article.

2. The article of claim 1, wherein the filler is present in a range between about 1 wt. % to about 80 wt. % based on the total weight of the fiber.

3. The article of claim 1, wherein the cellulose nanofibrils are present in a range between about 1 wt. % to about 80 wt. % based on the total weight of the article.

4. The article of claim 1, wherein the ash is precipitated calcium carbonate, ground calcium carbonate, gypsum, titanium dioxide, clay, silica, or any combination thereof.

5. The article of claim 1, wherein the filler comprises particles having an average size of less than about 20 micrometers in diameter.

6. The article of claim 1, further comprising a processing aid.

7. The article of claim 6, wherein the processing aid is present in a range between about 0.5 wt. % to about 10 wt. % based on the total weight of the fiber.

8. The article of claim 6, wherein the processing aid is carboxymethylcellulose, starch, glyoxal, glutaraldehyde, dialdehydes boric acid carbonate, zirconium ammonium carbonate, glyoxalated polyacrylamide, polyamide-epichlorohydrin, polyamine-epichlorohydrin, urea-formaldehyde, melamine-formaldehyde, polyethyleneimine, propylene glycol, diethylene glycol, triethylene glycol, dipropylene glycol, glycerol, or any combination thereof.

9. A paper web comprising the article of claim 1, wherein the article is the fiber.

10. The article of claim 1, wherein the PVOH has a degree of polymerization in a range between about 500 to about 3,000.

11. The article of claim 10, wherein the degree of polymerization is in a range between about 1,000 to about 1,600.

12. The article of claim 11, wherein the PVOH has a degree of hydrolysis of greater than about 95%.

13. The article of claim 12, wherein the PVOH has a degree of hydrolysis of greater than about 98%.

14. A paper web comprising:
a cellulosic substrate having a surface; and
a fiber impregnating the cellulosic substrate and having an average diameter in a range between about 1 micrometer and about 80 micrometers;
wherein the fiber comprises a binder and a filler, the binder being cellulose nanofibrils, and the filler being deinking waste solids comprising ash and cellulose fines, the cellulose nanofibrils impregnating or encapsulating the deinking waste solids.

15. The article of claim 14, wherein the filler is present in the fiber in a range between about 5 wt. % to about 50 wt. % based on the total weight of the fiber.

16. A method of making an article of manufacture, the method comprising:
impregnating or encapsulating a binder with a filler to form a filler impregnated binder or a filler encapsulated binder, the filler being deinking waste solids comprising ash and cellulose fines, and the binder being a PVOH and cellulose nanofibrils; and preparing an extrudable dope from the filler impregnated binder or the filler encapsulated binder;

wherein the article is a fiber or a film and the PVOH is present an amount in a range between about 20 wt. % to about 99 wt. % based on the total weight of the article.

17. The method of claim 16, further comprising wet spinning, dry spinning, shear spinning, or slit extruding the extrudable dope to form the fiber or the film.

18. The method of claim 16, wherein the cellulose nanofibrils are at least one of a cellulose nanofibril or a cellulose fibrid.

19. The method of claim 16, further comprising homogenizing wood pulp fibers or other fibrillatable cellulose to form the cellulose nanofibrils.

* * * * *